United States Patent [19]
Tingmo

[11] Patent Number: 6,073,374
[45] Date of Patent: Jun. 13, 2000

[54] INSERTED SCREEN TYPE PHOTO ILLUMINATOR STAND

[75] Inventor: Lee Tingmo, Hong Kong, The Hong Kong Special Administrative Region of the People's Republic of China

[73] Assignee: Dongguan Universal Electronics Co., Ltd., Dongguan, China

[21] Appl. No.: 09/131,545

[22] Filed: Aug. 10, 1998

[30] Foreign Application Priority Data

Mar. 2, 1998 [CN] China .................................. 98 2 23371

[51] Int. Cl.[7] ...................................................... G09F 13/18
[52] U.S. Cl. ................................................. 40/546; 40/714
[58] Field of Search .............................. 40/546, 575, 658, 40/714

[56] References Cited

U.S. PATENT DOCUMENTS

| | | | |
|---|---|---|---|
| 2,548,126 | 4/1951 | Sholkin ........................................ | 40/546 |
| 2,611,981 | 9/1952 | Whitebread ................................. | 40/546 |
| 4,386,476 | 6/1983 | Schulman .................................... | 40/546 |
| 4,587,755 | 5/1986 | Sunshine ................................. | 40/546 X |

FOREIGN PATENT DOCUMENTS

| | | | |
|---|---|---|---|
| 259799 | 5/1963 | Australia .................................... | 40/546 |
| 355787 | 9/1930 | United Kingdom ....................... | 40/546 |
| 8604496 | 8/1986 | WIPO .......................... | 40/152.2 FOR |

*Primary Examiner*—Cassandra H. Davis
*Attorney, Agent, or Firm*—Merchant & Gould P.C.

[57] ABSTRACT

An inserted screen type photo illuminator stand, comprising a base seat and a light emitting base plate inserted into the base seat in an inserted screen manner. The base seat includes a bottom plate and a box cover. On the bottom plate are provided a light source, a battery box and AC, DC power sockets and a power switch is mounted on the base seat. The base plate is a light homogenizing plate which is inserted upright into the base seat in an inserted screen manner and which can be pulled out from the base seat if necessary. At the top of the base plate is provided a clip which is used to clip a photo or picture. The bottom side light radiated from the light source in the base seat enter through the bottom side of the base plate, made of transparent plate with back side painted in white, so that the whole base plate is full of homogenized rays of light and as a result the photo or picture covered on the base plate can be fully displayed. The illuminator stand features light and handy structure and convenience in replacing photos or pictures.

3 Claims, 4 Drawing Sheets

INSERTED SCREEN TYPE PHOTO ILLUMINATOR STAND

TECHNICAL FIELD

The present invention relates to a lamplight photo illuminator stand, particularly to an inserted screen type photo illuminator stand.

BACKGROUND ART

The conventional lamplight photo illuminator stand is a stand in which a transparent photo or picture is covered onto a light emitting tube so that the images and colors of the photo or picture can be displayed through the illumination of the lamplight. Although this kind of lamplight photo illuminator stand has been found wide applications, it always suffers from the drawbacks of bulkiness, inconvenience in mounting photos or pictures, light is inhomogeneity, etc., its manufacturing cost is rather high due to the complexity of its structure.

SUMMARY OF THE INVENTION

The object of the present invention is to provide an inserted screen type photo illuminator stand, which through the bottom single side light radiated from a light source in the base seat makes the whole base plate or screen full of homogenized rays of light so that a photo or picture covered onto the base plate or screen is fully displayed.

A kind of said inserted screen type photo illuminator stand of the present invention comprises a base seat and a light emitting base plate inserted into the base seat in an inserted screen manner, said base seat comprises a bottom plate and a box cover, with a light source, a battery box and an DC power socket provided on the bottom plate, and with a power switch provided on the base seat; said base plate is a light homogenizing plate, made of transparent plate with back side painted in white, which is integrally inserted upright in a screen type manner into the base seat and can be inserted into or pulled out of the base seat while changing photos or pictures, at the top of the base plate is provided a photo clip which is used to clip the photo or picture, the bottom side light radiated from the light source in the base seat enters from the bottom side of the base plate, and makes the whole base plate full of homogenized rays of light, as a result, a photo or picture covered onto the plate can be fully displayed.

The present invention is designed so that AC or DC power can be alternately used, and is adapted to be used in various applications. Due to the introduction of single side light source the lamplight is not needed to directly illuminate the photo or picture, so that the structure of the photo illuminator stand of a lamp lantern is thus simplified and the replacement of photos or pictures is made very convenient. The present invention features light and handy construction, simple and convenient making and conveniently in use.

BRIEF DESCRIPTION OF THE DRAWINGS

In the following, the present invention is further illustrated in detail with reference to the accompanying drawings, in which.

BEST MODE FOR CARRYING OUT THE INVENTION

Figure 1:
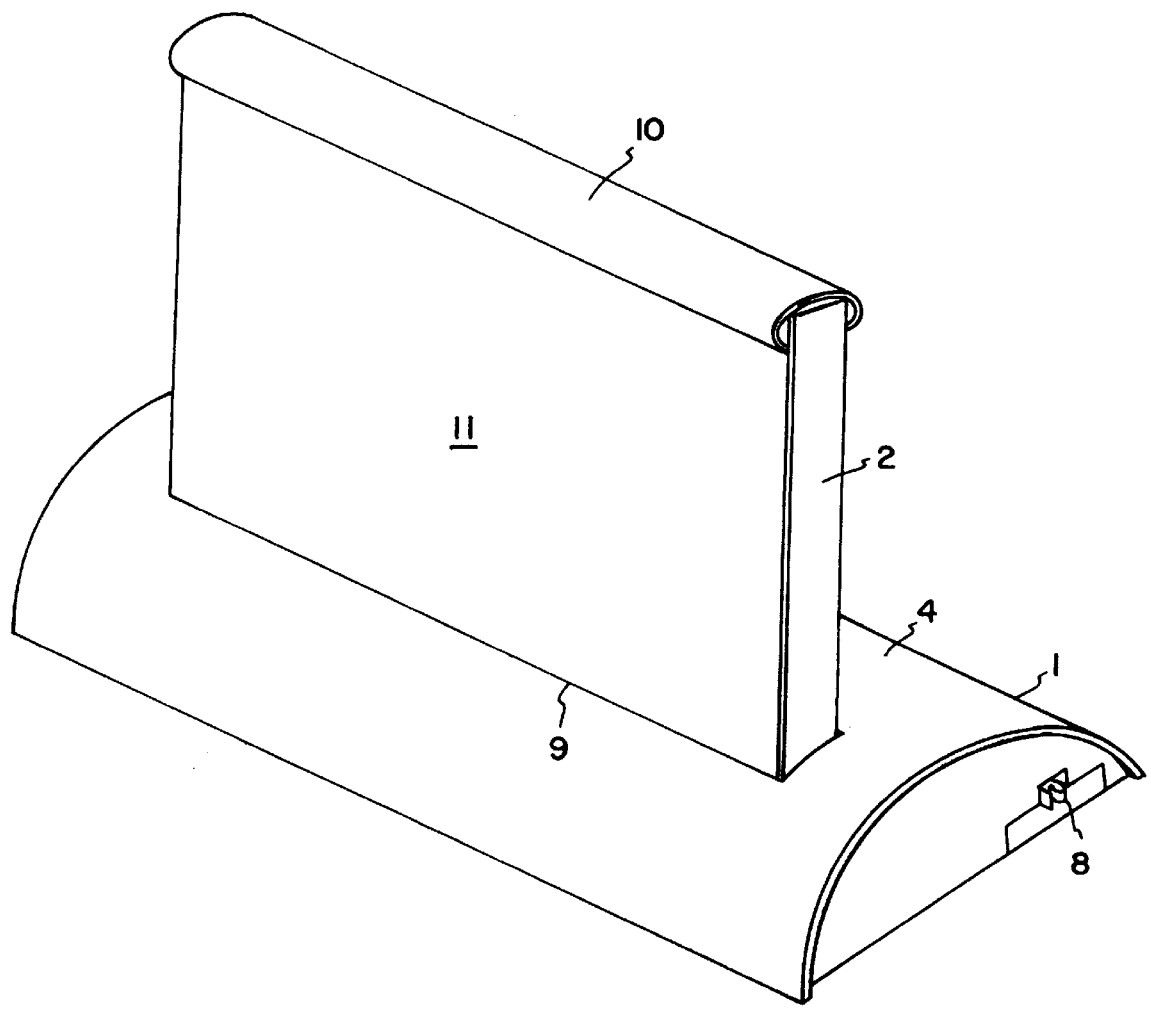
FIG. 1 is a right side perspective view of a kind of inserted screen type photo illuminator stand.
Figure 2:
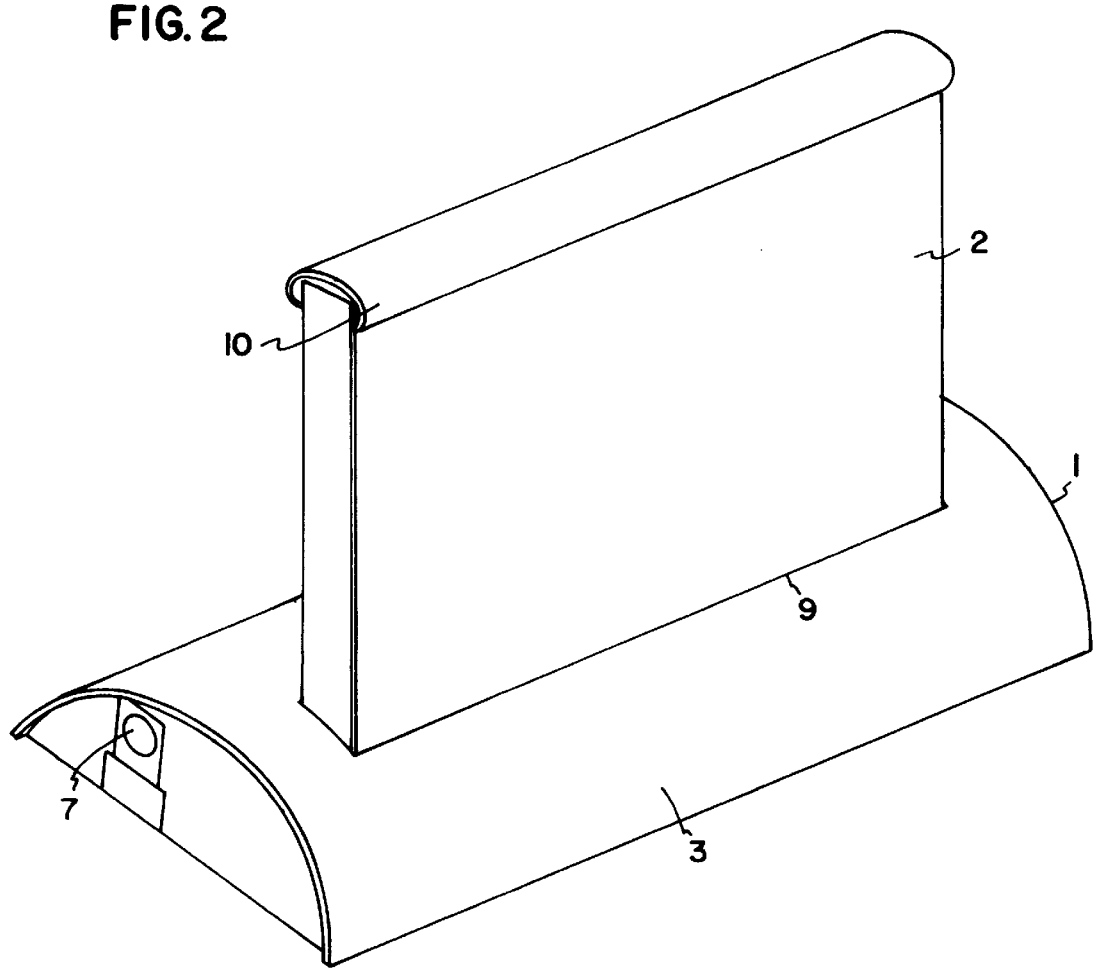
FIG. 2 is a left side perspective view of the above mentioned photo illuminator stand.
Figure 3:
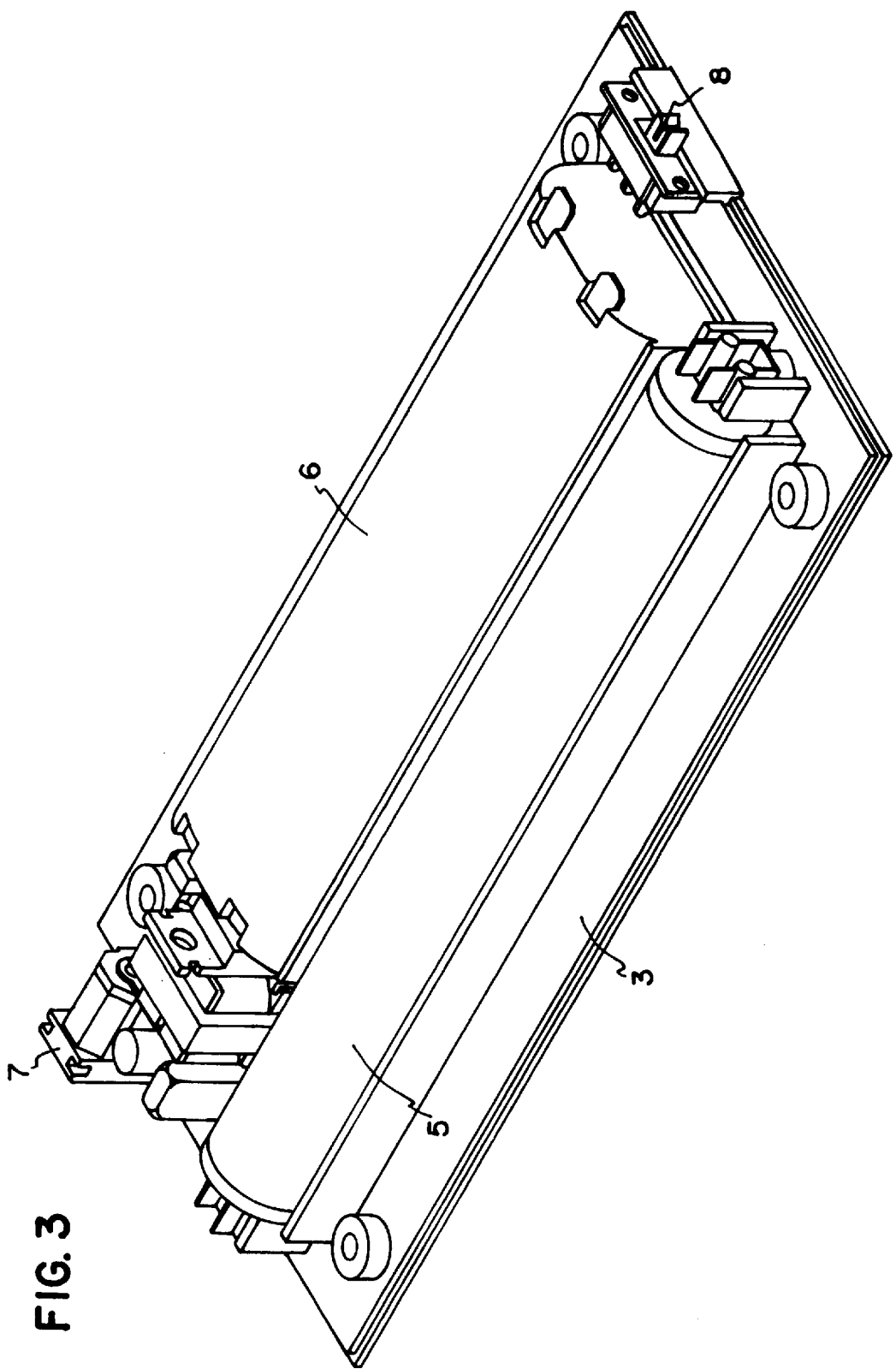
FIG. 3 is a schematic structural view of the bottom plate of the above mentioned photo illuminator stand.
Figure 4:
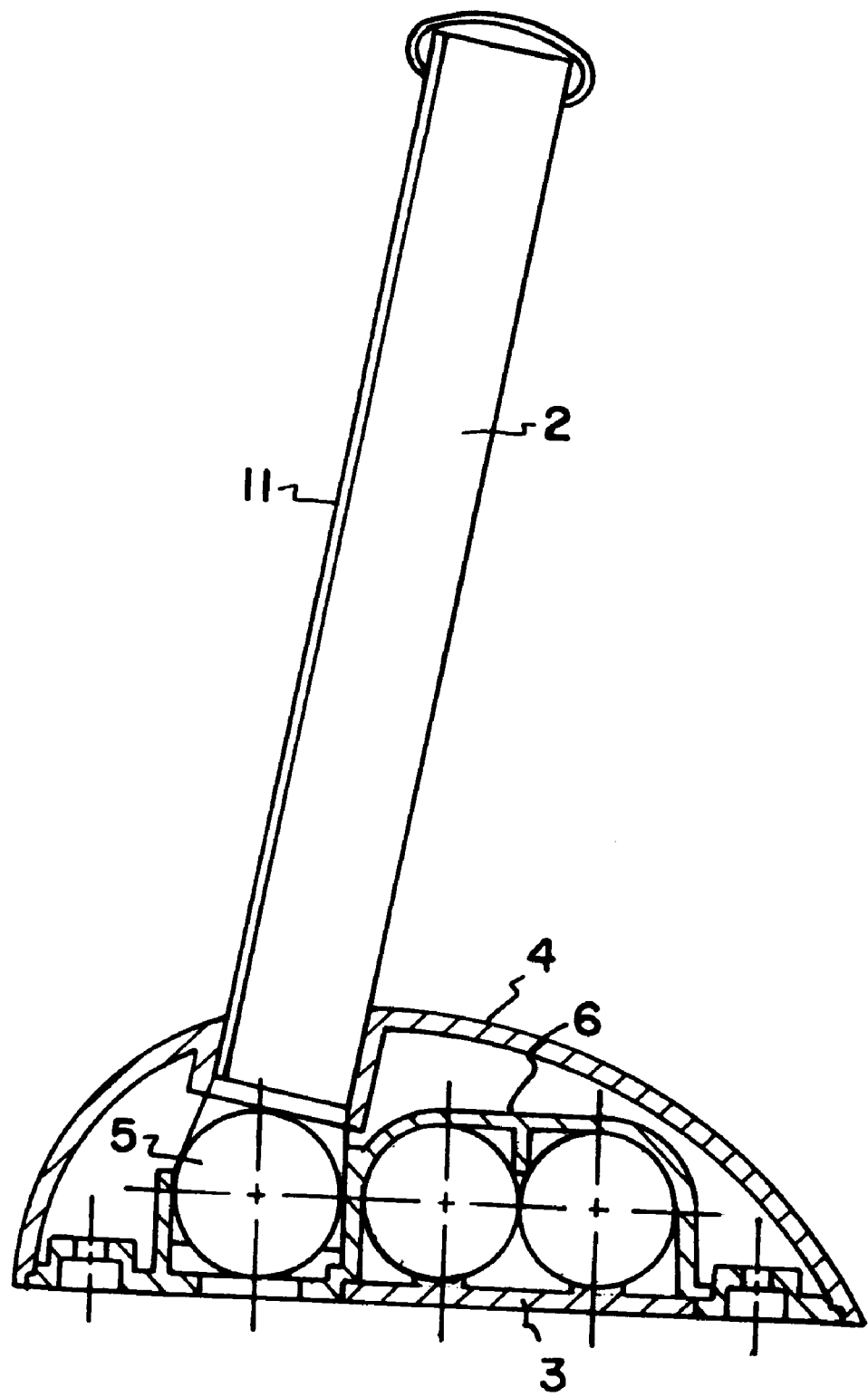
FIG. 4 is a sectional view of the above-mentioned photo illuminator stand.

Referring to FIGS. 1–4, the inserted screen type photo illuminator stand of the present invention comprises a base seat 1 and a light emitting base plate 2 inserted into the base seat 1 in an inserted screen manner.

The base seat 1 comprises a bottom plate 3 and a box cover 4. On the bottom plate 3 are mounted a light source 5, a battery box 6 and AC, DC sockets 7. A power switch 8 is mounted on the base seat 1. The switch 8 can be either mounted on the bottom plate 3 or on the box cover of the base seat 4. A slot 9 is provided in the box cover 4. The box cover 4 and the bottom plate are assembled into an integral.

The base plate 2 is a light homogenizing plate which is inserted upright into the slot 9 of the base seat 1 in an inserted screen manner; and can be pulled out from the base seat 1 if necessary. At the top of the base plate 2 is provided a photo clip 10 which is used to clip a photo or picture.

The single side light radiated from the light source 5 in the base seat 1 enter through the side of the base plate 2, made of transparent plate with back side painted in white, so that the whole base plate 2 is full of homogenized light and as a result the photo or picture covered onto the base plate 2 can be fully displayed.

The bottom plate 3 and the box cover 4 of the base seat 1 of the present invention can be either made into an integral or manufactured and assembled separately.

What is claimed is:

1. An insert screen photo illuminator stand, which comprises a base seat and a light emitting base plate inserted into the base seat in an inserted screen manner; said base seat comprises a bottom plate and a box cover, and mounted to the bottom plate are provided a light source, a battery box and AC/DC power sockets, a power switch is mounted on said base seat; said base plate is a planar light homogenizing plate having a top and bottom edge made of transparent plate with back side painted in white, which is inserted upright into the base seat in an inserted screen manner and which can be pulled out from the base seat if necessary; at the top edge of the base plate is provided a photo clip which is used to clip a photo or a picture against the surface of the base plate for illumination therethrough; at the bottom edge light radiated from the light source in the base seat enters from the bottom edge of the base plate so that the base plate is full of homogenized light rays and as a result the photo or picture covered on the base plate can be fully displayed.

2. The inserted screen type photo illuminator stand according to claim 1, characterized in that, said power switch is mounted on the bottom plate of the base seat.

3. The inserted screen type photo illuminator stand according to claim 1, characterized in that said power switch projects from the box cover of the base seat.

* * * * *